(12) United States Patent
Cottingham et al.

(10) Patent No.: US 12,081,650 B2
(45) Date of Patent: *Sep. 3, 2024

(54) SERVER SIDE AUTHENTICATION

(71) Applicant: Capital One Services, LLC, McLean, VA (US)

(72) Inventors: Elias Cottingham, McLean, VA (US); Eric Delgado, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,207

(22) Filed: Jan. 25, 2023

(65) Prior Publication Data

US 2023/0171087 A1 Jun. 1, 2023

Related U.S. Application Data

(63) Continuation of application No. 17/004,050, filed on Aug. 27, 2020, now Pat. No. 11,606,192, which is a
(Continued)

(51) Int. Cl.
*H04L 29/06* (2006.01)
*H04L 9/06* (2006.01)
(Continued)

(52) U.S. Cl.
CPC .......... *H04L 9/0643* (2013.01); *H04L 9/0662* (2013.01); *H04L 9/14* (2013.01);
(Continued)

(58) Field of Classification Search
CPC .................. H04L 9/0846; H04L 9/14
See application file for complete search history.

(56) References Cited

U.S. PATENT DOCUMENTS

| 2002/0087890 A1* | 7/2002 | Chan ................ G06F 21/41 |
| | | 726/5 |
| 2008/0181403 A1* | 7/2008 | Sakamoto ......... H04L 9/3236 |
| | | 708/250 |

(Continued)

OTHER PUBLICATIONS

Feb. 9, 2021—International Search Report and Written Opinion—PCT/US2020/060853.

*Primary Examiner* — Tri M Tran
(74) *Attorney, Agent, or Firm* — Banner & Witcoff, Ltd.

(57) ABSTRACT

A server may perform server side authentication of a user device. The user device may generate a first authentication string by performing a hash function on a username, a password, and a first salt. The first authentication string may be registered with the server for subsequent login attempts. At login, the user device generates the first authentication string and transmits the first authentication string to the server. When the authentication strings match, the user device is authenticated. The user device may also update the first authentication string. The server may provide the first salt and a second salt to the user device. The user device may generate a first authentication string and a second authentication string from the first salt and the second salt, respectively. When the first authentication strings match, the server may update the user device's authentication string by replacing it with the second authentication string.

20 Claims, 12 Drawing Sheets

Related U.S. Application Data continuation of application No. 16/686,431, filed on Nov. 18, 2019, now Pat. No. 10,790,967.

(51) Int. Cl.
    *H04L 9/14*           (2006.01)
    *H04L 9/32*           (2006.01)
    *H04L 9/40*           (2022.01)

(52) U.S. Cl.
    CPC .......... *H04L 9/3226* (2013.01); *H04L 9/3236* (2013.01); *H04L 9/3271* (2013.01); *H04L 63/0846* (2013.01)

(56) References Cited

U.S. PATENT DOCUMENTS

| | | |
|---|---|---|
| 2010/0199086 A1 | 8/2010 | Kuang et al. |
| 2011/0214173 A1* | 9/2011 | Kamel ................... G06F 21/45 726/5 |
| 2013/0124292 A1 | 5/2013 | Juthani |
| 2015/0046990 A1 | 2/2015 | Oberheide et al. |
| 2015/0172272 A1* | 6/2015 | Levner ................. H04L 63/083 726/7 |
| 2020/0036527 A1 | 1/2020 | Girdhar et al. |
| 2020/0036529 A1* | 1/2020 | Dequen ................. H04L 9/0863 |
| 2021/0091938 A1* | 3/2021 | Lurey ................... H04L 9/3218 |

* cited by examiner

100

SERVER SIDE AUTHENTICATION

REFERENCE TO RELATED APPLICATIONS

This application is a continuation of U.S. application Ser. No. 17/004,050, filed on Aug. 27, 2020 and entitled "Server Side Authentication" (now U.S. Pat. No. 11,606,192), which is a continuation of U.S. application Ser. No. 16/686,431, filed on Nov. 18, 2019 and entitled "Server Side Authentication" (now U.S. Pat. No. 10,790,967), the entireties of which are hereby incorporated by reference.

FIELD OF INVENTION

Aspects of the disclosure relate generally to authentication and more specifically to server-side authentication.

BACKGROUND OF THE INVENTION

Server-based authentication schemes traditionally require a user to register a password during account creation. The password is stored in a password file or database as a comparison for future log-in attempts. Some systems may store the password as plaintext, while other systems may provide some layer of security by obfuscating the stored password. During a log-in attempt, the user may transmit the password from the user device to the server. The server may receive the password associated with the log-in attempt and compare the received password with the previously registered password. When the passwords match, the user may be authenticated and granted access. While this affords one technique for authenticating users, it suffers from several vulnerabilities. For example, the user's password may be intercepted by a malicious actor in-transit between the user device and the server. Additionally, the server may be breached in a way that provides the malicious actor access to the user's username and password. Because people are bad at remembering passwords, people oftentimes reuse the same username and password on multiple systems. Thus, a single breach of the user's username and password may provide the malicious actor with access to several, if not all, of the user's accounts.

Aspects described herein may address these and other problems, and generally improve the security, efficiency, and speed with which server-side authentication occurs.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Example methods and systems as described herein may include server side authentication. As part of a registration process, a server may generate a salt and transmit the salt to the user device. In response to receiving the salt, the user device may derive an authentication string using the salt, a username, and a password. The authentication string may be transmitted to the server, along with the username, to register the user. During subsequent log-in attempts, the server may retrieve the salt from memory and transmit the salt to the user device. The user device may generate an authentication string using the received salt, their username, and their password. The generated authentication string may be transmitted to the server for authentication purposes. The server may receive the generated authentication string and compare the generated authentication string to the previously-registered authentication string. When the authentication strings match, the user may be authenticated and granted access.

Example methods and systems may also describe a rehydration technique, wherein users may update their authentication information. In response to request to update authentication information, the server may retrieve a first salt from memory and generate a second salt. The first salt and the second salt may then be sent (e.g., transmitted) to the user device. The user device may derive a first authentication string using the first salt, a username, and a password of the user. Additionally, the user device may generate a second authentication string using the second salt, the username, and the password. The username, the first authentication string, and the second authentication string may be transmitted to the server. The server may compare the first authentication string to a previously-registered authentication string. When the authentication strings match, the server may update the user's authentication information including, for example, replacing the first salt with the second salt and replacing the previously-registered authentication string with the second authentication string These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
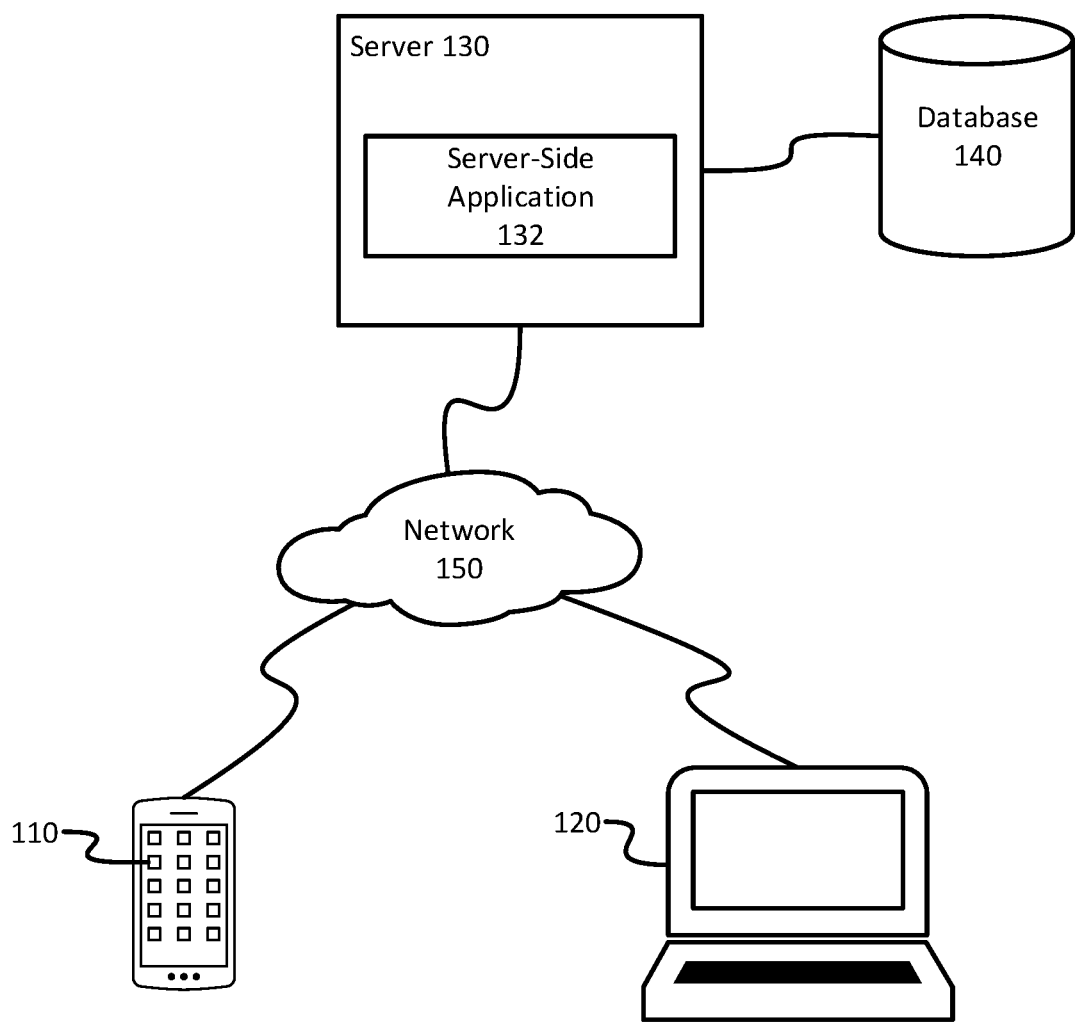
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods, systems, and techniques for server-side authentication. Instead of transmitting a password to a server for authentication purposes, a user device may transmit an authentication string that is derived from the user's password. The user's password may never leave the user's device. If the server is compromised and/or the authentication string intercepted in-transit, the authentication string may be compromised, while the user's password remains secure. This may provide security to user accounts that use the same password for authentication.

Example methods and systems as described herein may include server-side authentication. As part of a registration process, a server may generate a salt and transmit the salt to the user device. In some examples, the server may store the salt. In response to receiving the salt, the user device may derive an authentication string using the salt, a username, and a password. The authentication string may be transmitted to the server, along with the username, to register the user.

During subsequent log-in attempts, the server may retrieve the salt from memory and transmit the salt to the user device as part of the log-in process. The user device may generate an authentication string using the received salt, their username, and their password. The generated authentication string may be transmitted to the server for authentication purposes. The server may receive the generated authentication string and compare the generated authentication string to the previously-registered authentication string. When the authentication strings match, the user may be authenticated and granted access.

From time-to-time, a rehydration process may be performed that allows the user to update their authentication information, including their registered authentication string. The update may occur based on, or in response to, a breach detected at the server. Additionally, or alternatively, the user may prompt the update, for example, by selecting an update (e.g., change) password option. The server may retrieve a first salt from memory and generate a second salt. The first salt and the second salt may then be sent (e.g., transmitted) to the user device. In response to receiving the first salt and the second salt, the user device may derive a first authentication string and a second authentication string. The first authentication string may be generated from the first salt, a username, and a password of the user. Similarly, the second authentication string may be generated from the second salt, the username, and the password. The user device may then send (e.g., transmit) the username, the first authentication string, and the second authentication string to the server. The server may receive the username, the first authentication string, and the second authentication string and retrieve a previously-registered authentication string using the received username. The server may compare the first authentication string and the previously-registered authentication string. When the authentication strings do not match, the authentication information update may be denied. However, when the authentication strings match, the server may update the user's authentication information. Updating the user's authentication information may include replacing the first salt with the second salt and replacing the previously-registered authentication string with the second authentication string By using the techniques described herein, a user's password may be secured if the authentication string is intercepted in-transit and/or the server is breached since the password never leaves the user's device. A malicious actor may merely obtain a derivative of the user's password, thereby securing the user's account and any other additional accounts that use the same username and password.

Turning to FIG. 1, a system 100 is shown that includes a first user device 110, a second user device 120, and a server 130, connected to a first database 140, interconnected via network 150.

First user device 110 may be a mobile device, such as a cellular phone, a mobile phone, a smart phone, a tablet, or a laptop. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may require a user to enter a username and password before accessing the application. In this regard, the one or more application may be any suitable application obtained from a website, an online retail store or a digital distribution service, such as iTunes® or Google Play®, that that may perform the login and/or authentication techniques described herein.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. In some embodiments, second user device 120 may include one or more applications. The one or more application may be any suitable application obtained from a website, an online retail store or a digital distribution service that may perform the login and/or authentication techniques described herein.

Server 130 may be any server capable of executing server-side application 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

First database 140 may be configured to store information on behalf of server 130 and/or server-side application 132. According to some embodiments, first database 140 may be a database or table configured to provide directory services, for example, using Lightweight Directory Access Protocol (LDAP), Active Directory, or an equivalent directory service. For instance, first database 140 may include a corporate directory that comprises employees' information, such as the employees' first and last names, usernames, email addresses, phone numbers, department information, authentication information (e.g., passwords, authentication strings), etc. In some embodiments, first database 140 may be encrypted to protect the information contained therein. First database 140 may include, but are not limited to relational databases, hierarchical databases, distributed databases, in-memory databases, flat file databases, XML databases, NoSQL databases, graph databases, and/or a combination thereof. In some examples, database 140 and server 130 may be located on the same physical computing device.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as login information (e.g., username and password, username and authentication string), confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
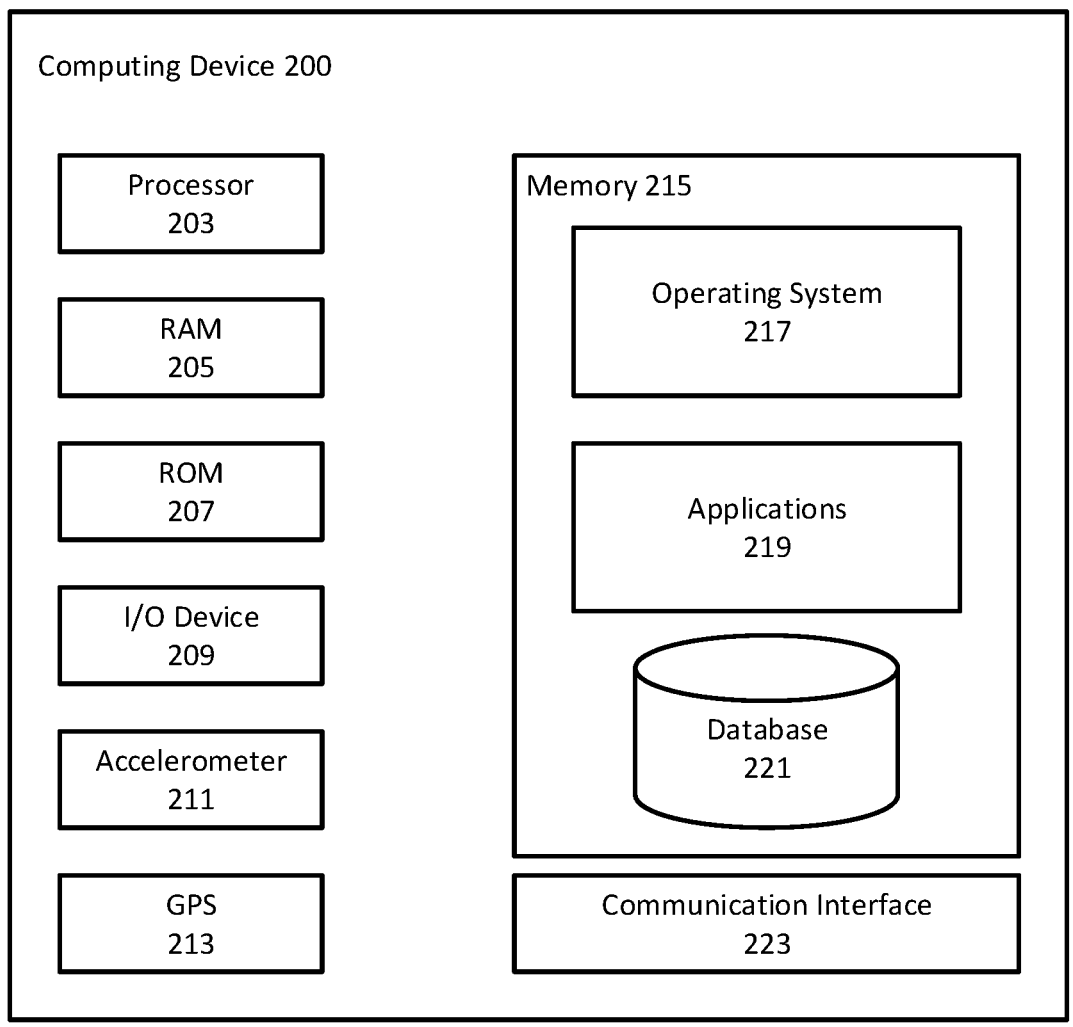
FIG. 2 shows an example computing device in accordance with one or more aspects described herein.

Any of the devices and systems described herein may be implemented, in whole or in part, using one or more computing systems described with respect to FIG. 2. Turning to FIG. 2, a computing device 200 is described. The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. In some embodiments, I/O device 209 may include an image capture device, such as a camera. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
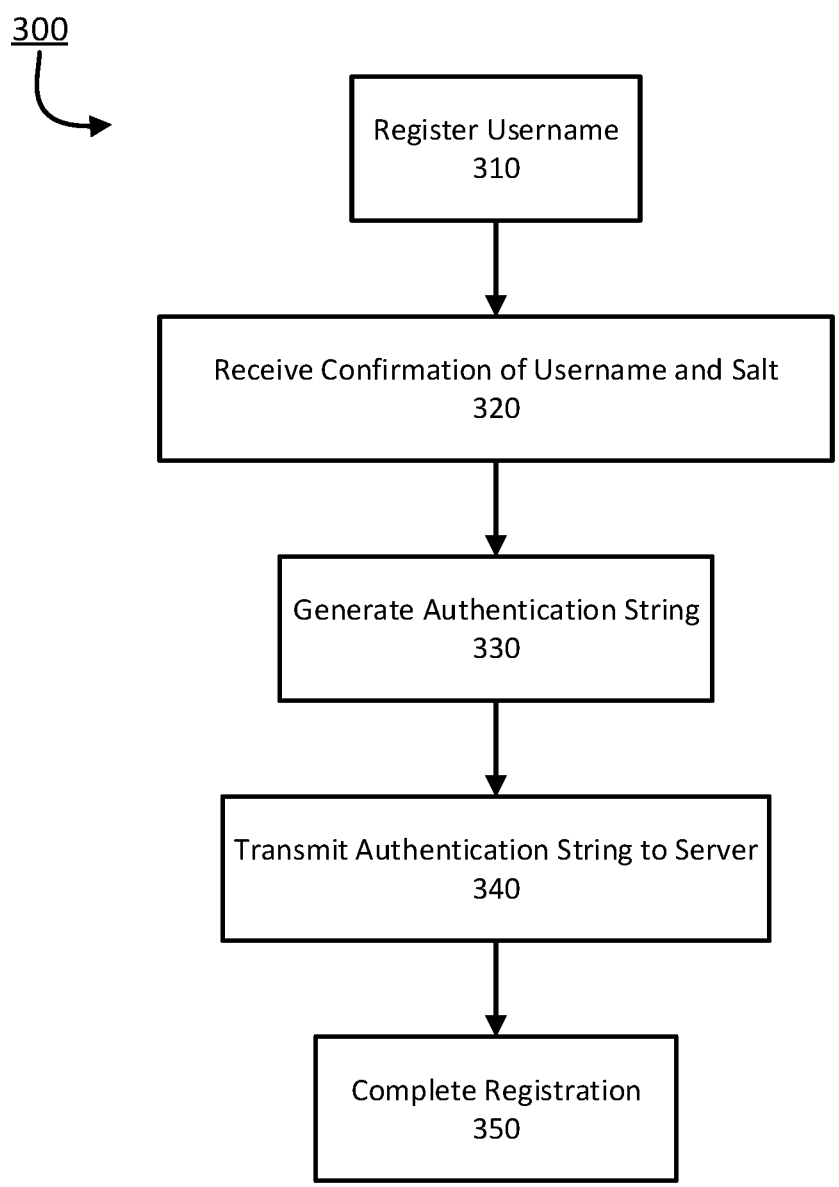
FIG. 3 shows a flow chart of a process for registering a new account at a user device according to one or more aspects of the disclosure.

As part of a new account creation and/or new registration process, a user may generate and/or register baseline authentication information (e.g. username, password, authentication string, etc.) that may serve as a comparison point for subsequent login attempts. FIG. 3 shows a flow chart of a process for registering a new account at a user device according to one or more aspects of the disclosure. Some or all of the steps of process 300 may be performed using one or more computing devices as described herein.

In step 310, a user device (e.g., an application executing on the user device) may register a username. The username may be entered as part of a new account creation, for example, based on downloading and installing a new application. Additionally, or alternatively, the username may be entered via a webpage as part of a new account creation process. In these examples, the user device may transmit the username to a server to verify that the username is available. The user device may transmit the username to the server via a secure communication channel, such as a channel secured using SSL, TLS, or an equivalent thereof. When the server indicates that the username is not available, the user device may be notified and the user may be prompted to select a different username. This process may continue, for example, until the username selects a unique username. In some embodiments, a username may be assigned as part of the registration process, for example, by an administrator.

In step 320, the user device (e.g., an application executing on the user device) may receive confirmation of the username and a salt. The confirmation of the username and the salt may be received from the server via a secure communication channel (e.g., SSL, TLS). The user device (e.g., the application executing on the user device) may prompt the user to enter a password, for example, based on or in response to receiving the confirmation and the salt. In step 330, the user device (e.g., the application executing on the user device) may generate an authentication string. The authentication string may be a derivative (e.g., hashed representation) of the user's password. The authentication string may be derived by performing a one-way transformation (e.g., MD5, SHA128, SHA256, SHA512, PBKDF2, BCrypt, SCrypt, etc.) on the username, password, and the salt. In some instances, the username and/or password may be padded before being hashed. As a result of the one-way transformation (e.g., hash function), the authentication string may be a fixed quantity (e.g., number) of bits (e.g., 64, 128, 256, 512, etc.) that has a high degree of entropy (e.g., randomness).

In step 340, the user device (e.g., the application executing on the user device) may transmit the authentication string to the server. In some embodiments, the username may be transmitted with the authentication string. The username and/or authentication string may be transmitted via a secure communication channel (e.g., SSL, TLS). By deriving an authentication string from the user's password, the user's password may never leave the user device. This may prevent the user's password from being intercepted in-transit between the user device and the server. Additionally, the user may not have to update one or more passwords, for example, based on a breach at the server since the server only has a derivative of the user's password.

In step 350, the user device (e.g., the application executing on the user device) may complete the registration process. Completing the registration process may include receiving a notification from the server that the registration has been finalized. Additionally, or alternatively, completing the registration process may include obtaining user information (e.g., name, address, phone number, email address, etc.) from the user to finalize their account information.

Figure 4:
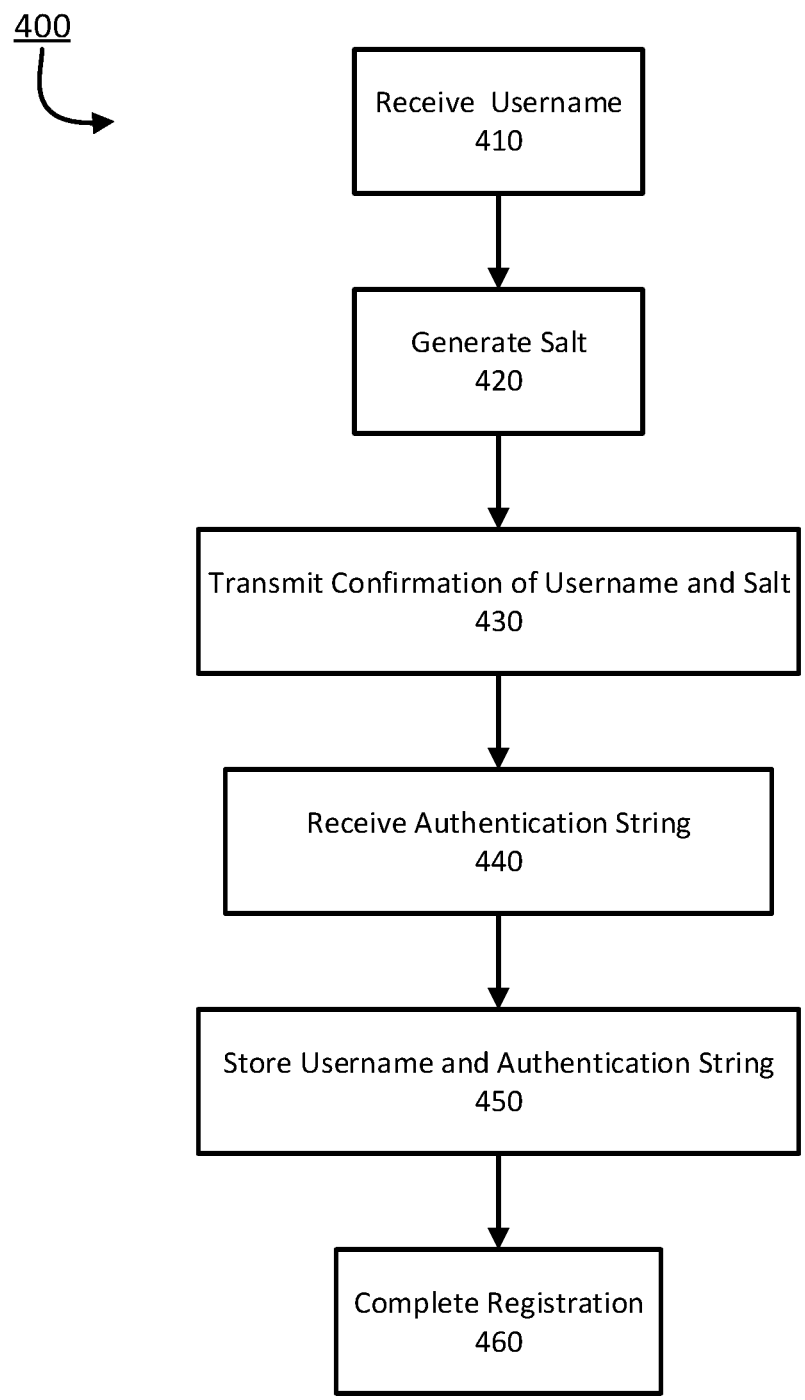
FIG. 4 shows a flow chart of a process for registering a new account at a server according to one or more aspects of the disclosure.

During a new account creation and/or new registration process, a server may verify information provided by the user device and create an entry for the new user account. FIG. 4 shows a flow chart of a process for registering a new account at a server according to one or more aspects of the disclosure. Some or all of the steps of process 400 may be performed using one or more computing devices as described herein.

In step 410, a server may receive an indication of a new account creation/registration. The indication may be received over a secure communication channel (e.g., SSL, TLS, etc.). Additionally, the indication may include a username. As noted above, the server may verify whether the username is available. For example, the server may query a database and/or password file (e.g., /etc/passwd, %System-Root%/system32/config/SAM) using the username to determine whether the username is available. When the username is available, the server may generate an entry for the user account in the database and/or password file. Additionally, the server may generate a salt (e.g., initialization vector, etc.) in step 420. The salt may be a pseudorandom character string generated by a pseudorandom number generator. Additionally, or alternatively, the pseudorandom character string may be derived from a file (e.g., /dev/urandom, /dev/arandom, etc.) that collects environmental noise from the server (e.g., device drivers, etc.).

In step 430, the server may transmit a confirmation of the username and the salt to the user device. The confirmation and the salt may be transmitted over a secure communication channel (e.g., SSL, TLS, etc.). In step 440, the server may receive the authentication string. The authentication string may be received over a secure communication channel. In some examples, the server may receive the previously-registered username with the authentication string. In step 450, the server may store the username and authentication string. The username and authentication string may be stored in a database, such as database 140. In particular, the server may store the username and authentication string in the previously generated entry in the database and/or password file.

In step 460, the server may complete the registration process. This may include finalizing the user account entry in the database and/or password file. Finalizing the user account entry may include entering and saving, the user's name, address, phone number, email address, etc. Additionally, or alternatively, the salt may be stored in the database and/or password file. In some examples, the server may send (e.g., transmit) a notification to the user device that the registration process has completed.

Figure 5:
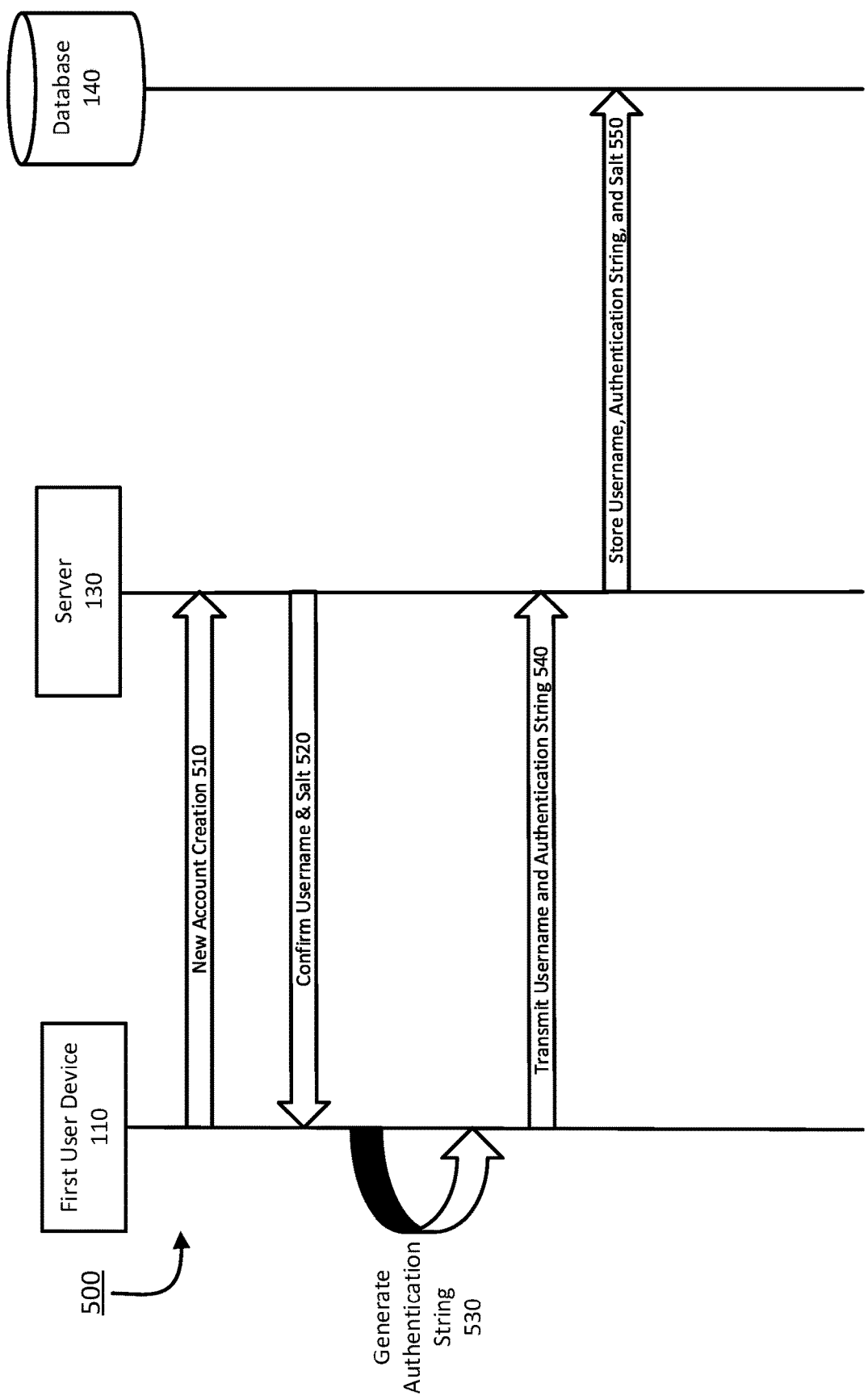
FIG. 5 shows a flow chart of a system for creating a new account according to one or more aspects of the disclosure.

Turning to FIG. 5, an example of a system for creating a new account according to one or more aspects of the disclosure is shown. System 500 includes first user device 110, server 130, and database 140. At step 510, first user device 110 may transmit a new account creation request to server 130. As noted above the new account creation request may include a username. The server 130 may verify the username is available. When the username is available, server 130 may generate a salt. In step 520, the server 130 may transmit confirmation of the username and the salt to the first user device. The first user device 110 may receive the confirmation and the salt. In step 530, the first user device 110 may generate the authentication string. As discussed above, the first user device 110 may generate the authentication string by performing a one-way transformation (e.g., hash function) on the username, a password, and the salt. In step 540, the first user device 110 may transmit the username and the authentication string to the server. In step 550, the server 130 may store the username, authentication string, and salt in database 140.

Figure 6:
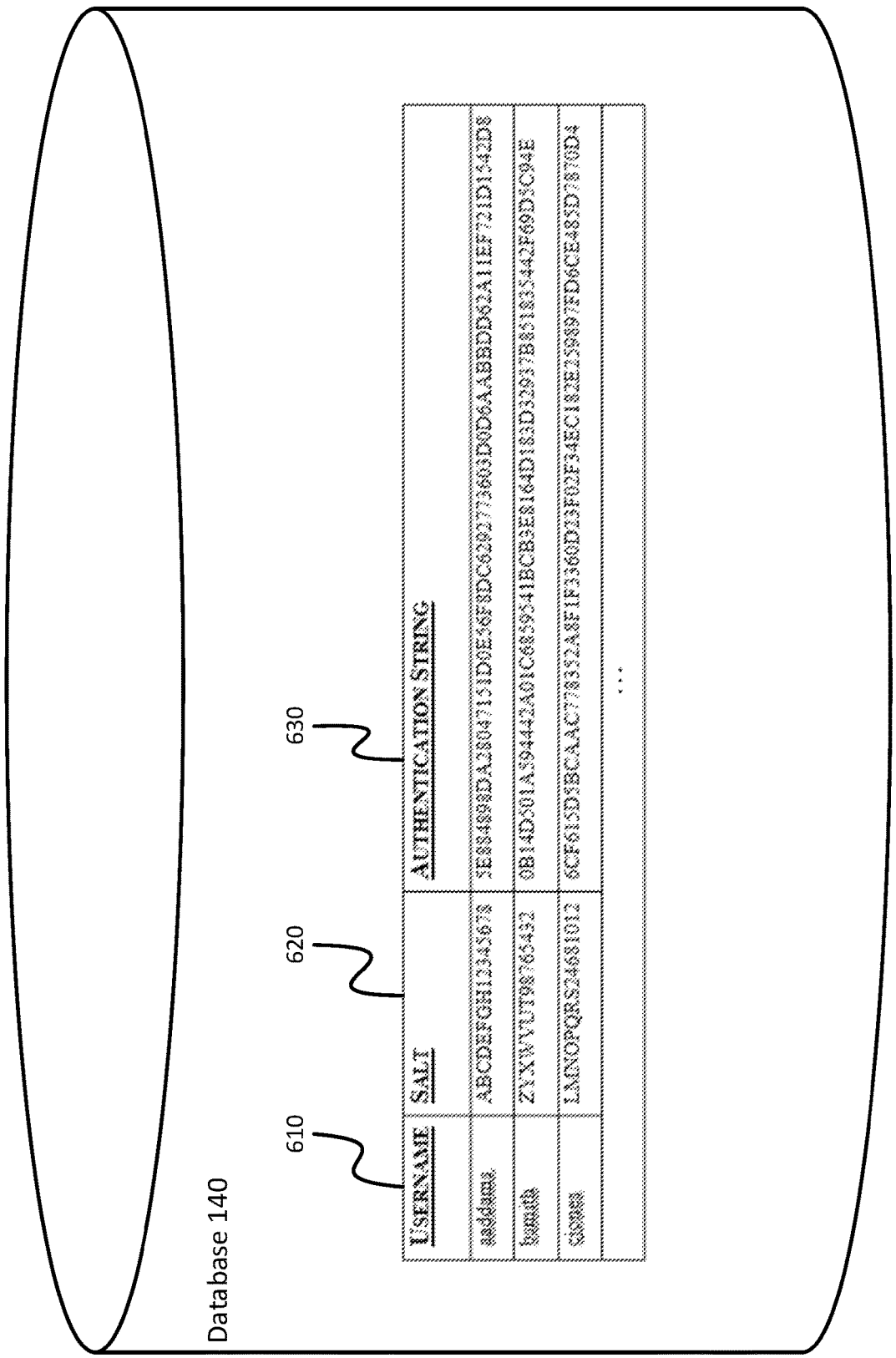
FIG. 6 shows an example of stored user account information according to one or more aspects of the disclosure.

As noted above, the server may create an entry in a database and/or password file each time a new account is generated. FIG. 6 shows an example of stored user account information according to one or more aspects of the disclosure.

The stored user account information may be stored in a database, such as database 140 described above. Additionally, or alternatively, the user account information may be stored in a password file. The user account information may comprise a username column 610, a salt column 620, and an authentication string 630. The username column 610 may comprise usernames, or other aliases, for registered accounts. The salt column 620 may comprise a pseudorandom number generated by the server (e.g., server-side application executing on server 130) and transmitted to the user device to derive the authentication string. The authentication string column 630 may comprise the authentication provided by the user device during the account creation and/or registration process. While username column 610, salt column 620, and authentication string 630 are illustrated in FIG. 6, it will be appreciated that the user account information may include additional information. For example, the user account information may include the user's actual name (e.g. first name, last name), a user identifier number, a group identifier number, a gecos field, and the like. The user identifier number may be an employee identification number or any equivalent thereof that the system may configured to identify the user to the system. The group identifier number may identify a user group that the user belongs to, such as the user's workgroup (e.g., sales, marketing, legal, etc.). The group identifier number may also be configured to identify the user's permissions (e.g. read access, write access). The gecos field may include general information about the user, such as the user's full name, office phone number, home telephone number, and/or additional contact information (e.g., cell phone, email, supervisor, etc.).

Figure 7:
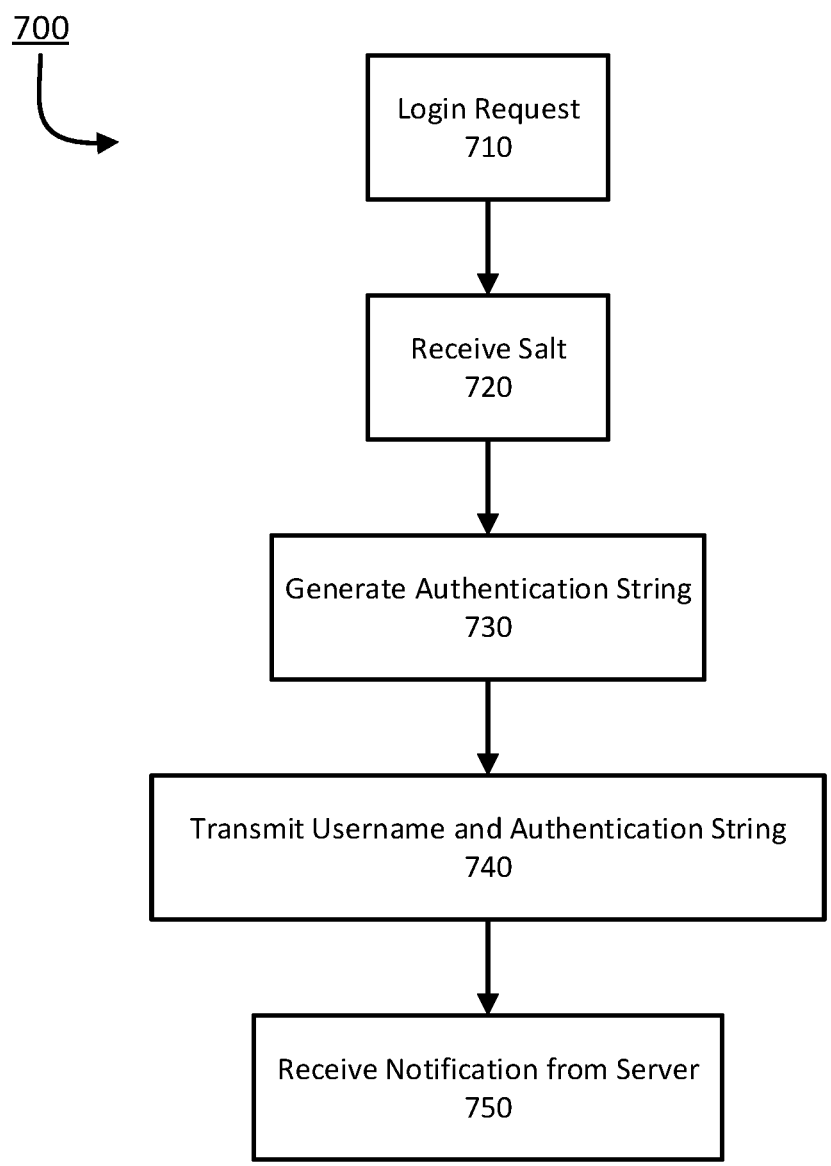
FIG. 7 shows a flow chart of a process for logging in according to one or more aspects of the disclosure.

Once the user has completed registration, the user may use the information provided during the registration process to perform subsequent logins. FIG. 7 shows a flowchart of a process for logging in according to one or more aspects of the disclosure. Some or all of the steps of process 700 may be performed using one or more computing devices as described above.

In step 710, a user device (e.g., an application executing on the user device) may send (e.g., transmit) a login request to a server. The login request may comprise a username. In some examples, the login request may be transmitted over a secure communication channel, such as one secured by SSL, TLS, or the like. In step 720, the user device may receive a salt. The salt may be received from the server over the secure communication channel. The salt may be received, for example, based on or in response to transmitting the login request. In some examples, the salt may be stored in a secure memory of the user device. Accordingly, the salt may be retrieved from the secure memory during a login attempt. In these examples, step 720 may be skipped.

In step 730, the user device (e.g., the application executing on the user device) may generate the authentication string. The authentication string may be generated by performing a one-way transformation (e.g., hash function) on the username, the password, and the salt. In some examples, the username and/or the password may be padded prior to being hashed. The padding information may be a random string of data configured to extend the username and/or password to a fixed length. In step 740, the user device may send (e.g., transmit) the username and the authentication string to the server. As noted above, the username and the authentication string may be transmitted over a secure communication channel. In step 750, the user device (e.g., the application executing on the user device) may receive a notification from the server. When the login request is successful, the user device may receive indication that the login request was successful. The user device may be provided access to one or more services provided by the server and/or a server-side application. When the login request is not successful, the user device may be notified of such. The user device may be provided an opportunity to login again. In some instances, the user device may have to wait a certain period of time before attempting another login request.

Figure 8:
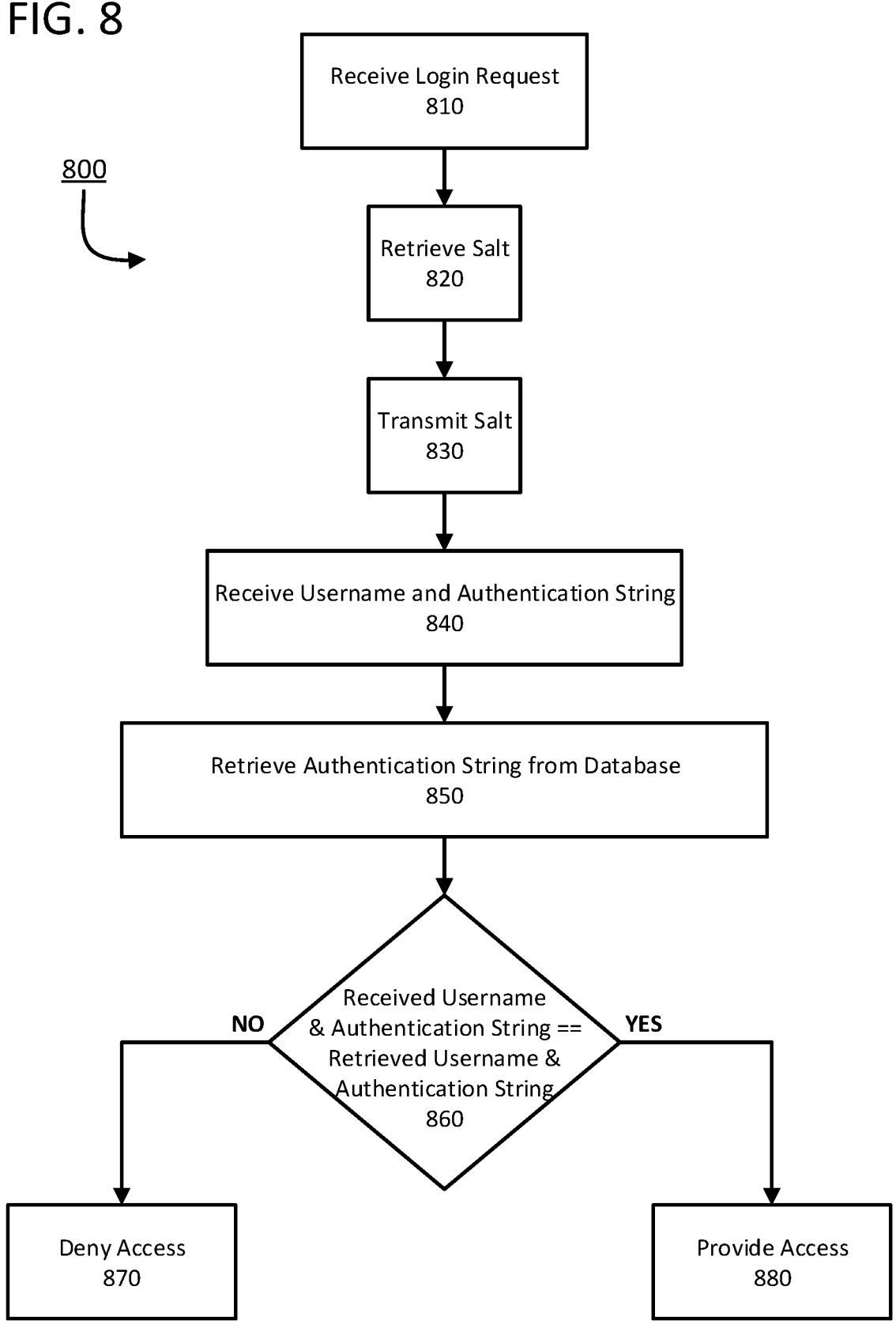
FIG. 8 shows a flow chart of a process for verifying a login request according to one or more aspects of the disclosure.

In response to receiving a login request, the server may provide the user device with a salt and verify the login request. FIG. 8 shows a flow chart of a process for verifying a login request according to one or more aspects of the disclosure. Some or all of the steps of process 800 may be performed using one or more computing devices as described herein.

In step 810, a server may receive a login request from a user device. As noted above, the user device may comprise a username. In step 820, the server may retrieve a salt. Retrieving the salt may comprise querying a database and/or password file using the username received in the login request. The query may return the salt associated with the username. In step 830, the server may transmit the salt to the user device. The salt may be transmitted over a secure communication channel (e.g., SSL, TLS, etc.). In step 840, the server may receive the username and an authentication string over a secure communication channel from the user device. In step 850, the server may retrieve a previously-registered authentication from a database and/or a password file. Again, the server may use the username received with the authentication string to query the database and/or the password file. In response to the query, the server may receive the previously-registered authentication string from the database and/or the password file. In step 860, the server may compare the received username and the received authentication string to the previously-registered username and the previously-registered username. In some instances, the server may compare the received authentication string and the previously-registered username. When the received authentication string and the previously-registered username do not match, the server may deny access to the user device in step 870. However, when the received authentication string and the previously-registered username match, the server provides access to the user device in step 880.

Figure 9:
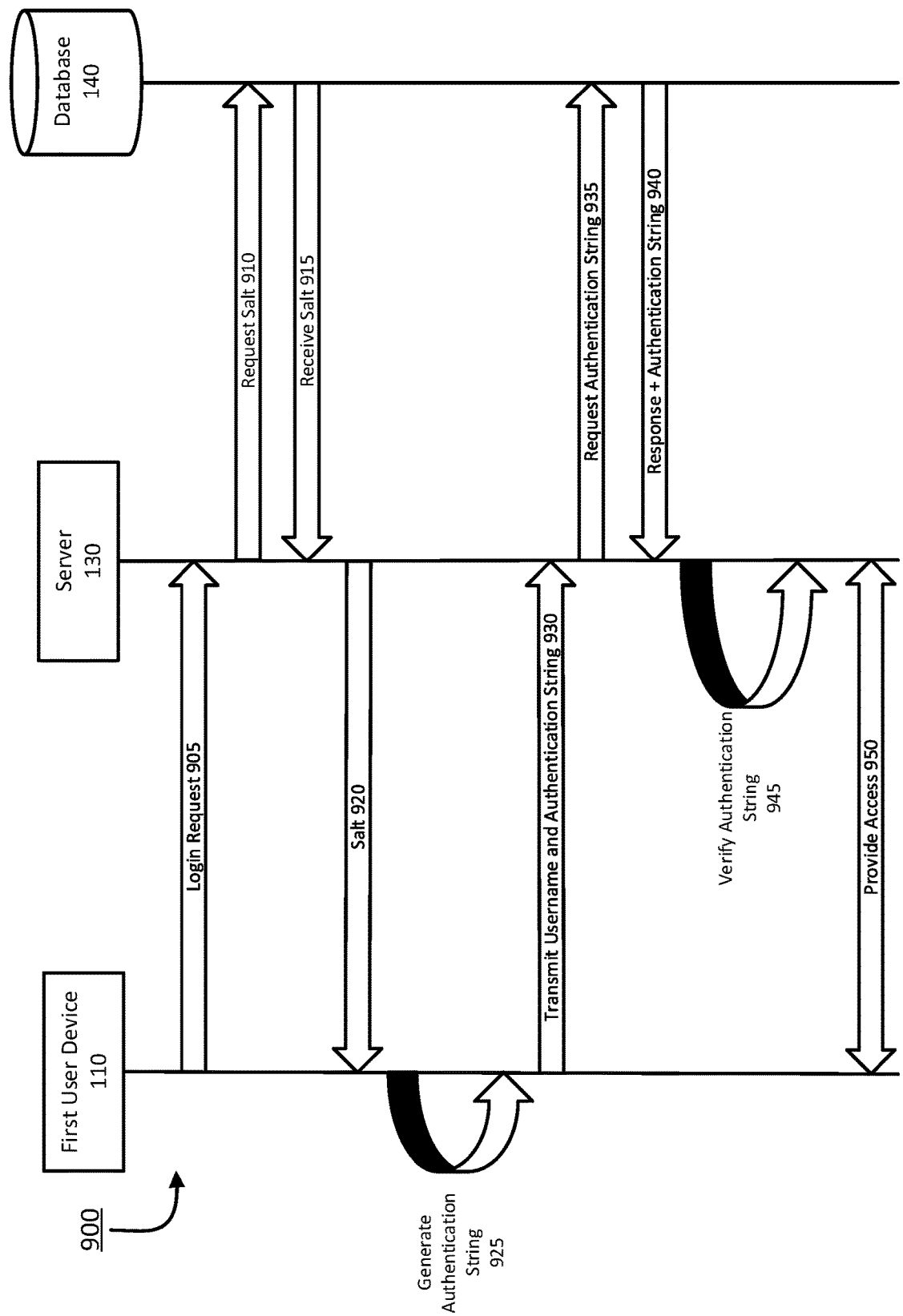
FIG. 9 shows an example of a system for logging in according to one or more aspects of the disclosure.

Turning to FIG. 9, an example of a system for logging in according to one or more aspects of the disclosure is shown. System 900 includes first user device 110, server 130, and database 140. At step 905, the user device 110 may transmit a login request to server 130. The login request may include a username and be transmitted via a secure communication channel. The server 130 may transmit a request for a salt to database 140 in step 910. As noted above, the request for the salt may be a query. The query may include the username received in the login request. In some examples, the request for the salt may be transmitted over a secure communication channel. In other examples, the database 140 may be co-located with server 130. In step 915, the database 140 may provide the salt to server 130. In step 920, the server 130 may transmit the salt to the user device 110. In step 925, the user device 110 may generate an authentication string using the techniques described herein. In step 930, the user device 110 may send (e.g., transmit) the username and the generated authentication string to the server 130. In step 935, the server 130 may request a previously-registered authentication string from database 140. The request may be a database may be a query that includes the received username. In response to the request, the database 140 may send (e.g., transmit) the previously-registered authentication string to the server 130 in step 940. In step 945, the server 130 may authenticate the login request. Authenticating the login request may comprise comparing the received authentication string and the previously-registered authentication string. When the authentication strings do not match, the login request may be denied. However, when the authentication strings match, the login request may be verified and the user device may be provided access in step 950.

It will be appreciated that the above login techniques may be used alone or in combination with other authentication techniques. For example, the authentication string discussed above may be used as part of a multi-factor authentication process. For example, a user may provide their username and authentication string, as well as a biometric identifier (e.g., facial recognition, fingerprint, voiceprint, retina scan, iris scan, etc.). In these examples, the user may register one of more biometric identifiers. During subsequent login attempts, the user may provide their username, authentication string, and biometric identifier to gain access. Additionally, or alternatively, the authentication processes discussed above may be used in conjunction with a token that generates a one-time code (e.g. password, passphrase, etc.). Accordingly, the user may provide their username, authentication string, and a one-time code during login attempts.

Furthermore, by employing the login techniques described herein, the user's password may remain secure on the user device. This reduces the likelihood of a malicious actor obtaining the user's password while the password is in-transit. Additionally, using a derivative of a password for authentication purposes secures the user's password in case of a breach at the server. This may ensure that other accounts that have the same username and password would not be compromised in the event of a breach of the server. Accordingly, the user may not have to take corrective action (e.g., update their passwords on other accounts) in response to a breach that occurs at a third-party (e.g., server), thereby improving the overall user experience.

Figure 10:
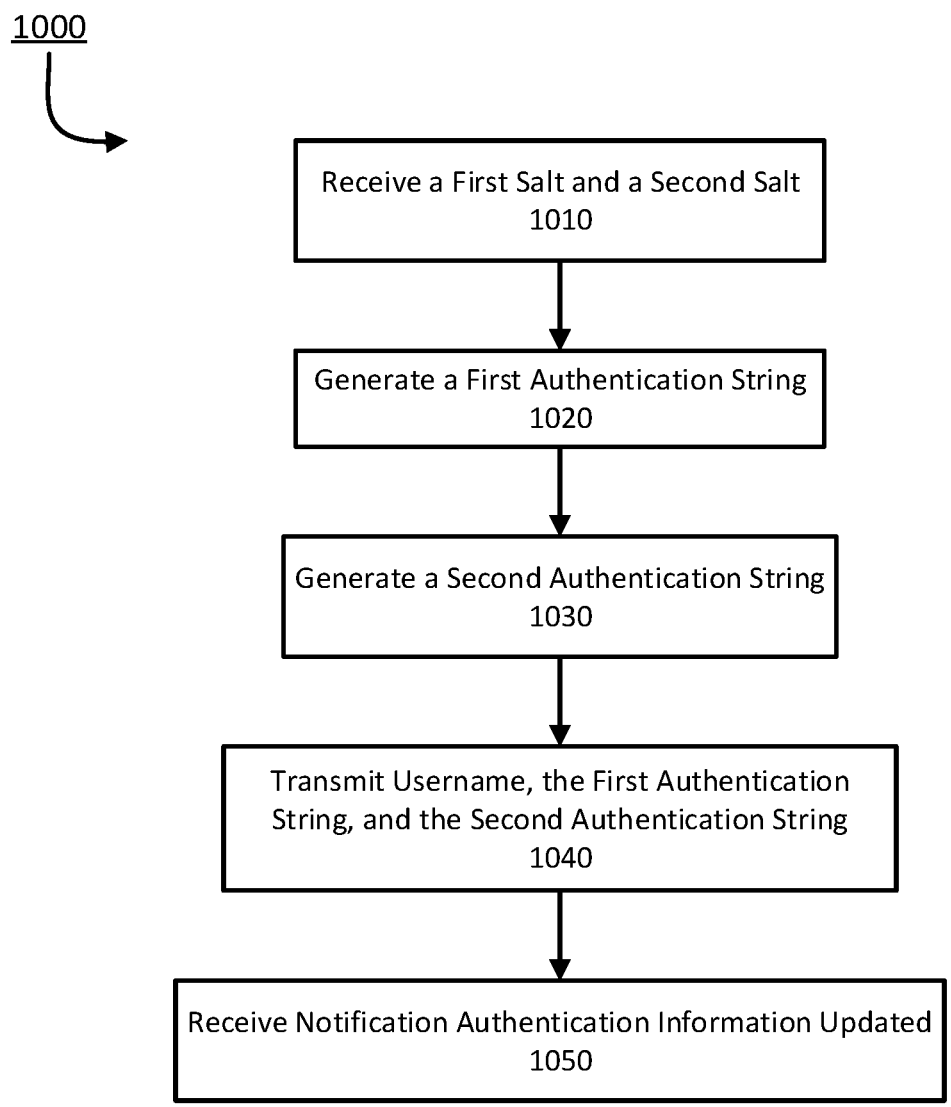
FIG. 10 shows a flow chart of a process for updating an authentication string at a user device according to one or more aspects of the disclosure.

From time-to-time, a user device may be required to perform rehydration and/or update their authentication information and, in particular, its authentication string. This update may be initiated by the user device, for example, in response to a user request to update their password. Alternatively, the update may be initiated by the server, for example, based on or in response to detecting a data breach. FIG. 10 shows a flowchart of a process for updating an authentication string at a user device according to one or more aspects of the disclosure. Some or all of the steps of process 1000 may be performed using one or more computing devices as described herein.

In step 1010, the user device (e.g., an application executing on the user device) may receive a first salt and a second salt. The first salt and the second salt may be received over a secure communication channel (e.g., SSL, TLS, etc.). In some examples, the first salt and the second salt may be received in a single communication. Alternatively, the first salt and the second salt may be received in separate communications. In step 1020, the user device may generate a first authentication string. The first authentication string may be generated by performing a one-way transformation (e.g., hash function) on a username, a password, and the first salt. As noted above, the username and/or the password may be padded prior to being hashed. In step 1030, the user device may generate a second authentication string. The second authentication string may be generated by performing a one-way transformation (e.g., hash function) on the username, the password, and the second salt. As noted above, the username and/or the password may be padded prior to being hashed. In step 1040, the user device may transmit the username, the first authentication string, and the second authentication string to the server. The username, the first authentication string, and the second authentication may be transmitted to the server, via a secure communication channel, in at least one communication. In step 1050, the user device may receive notification from the server that the user's authentication information has been updated.

Figure 11:
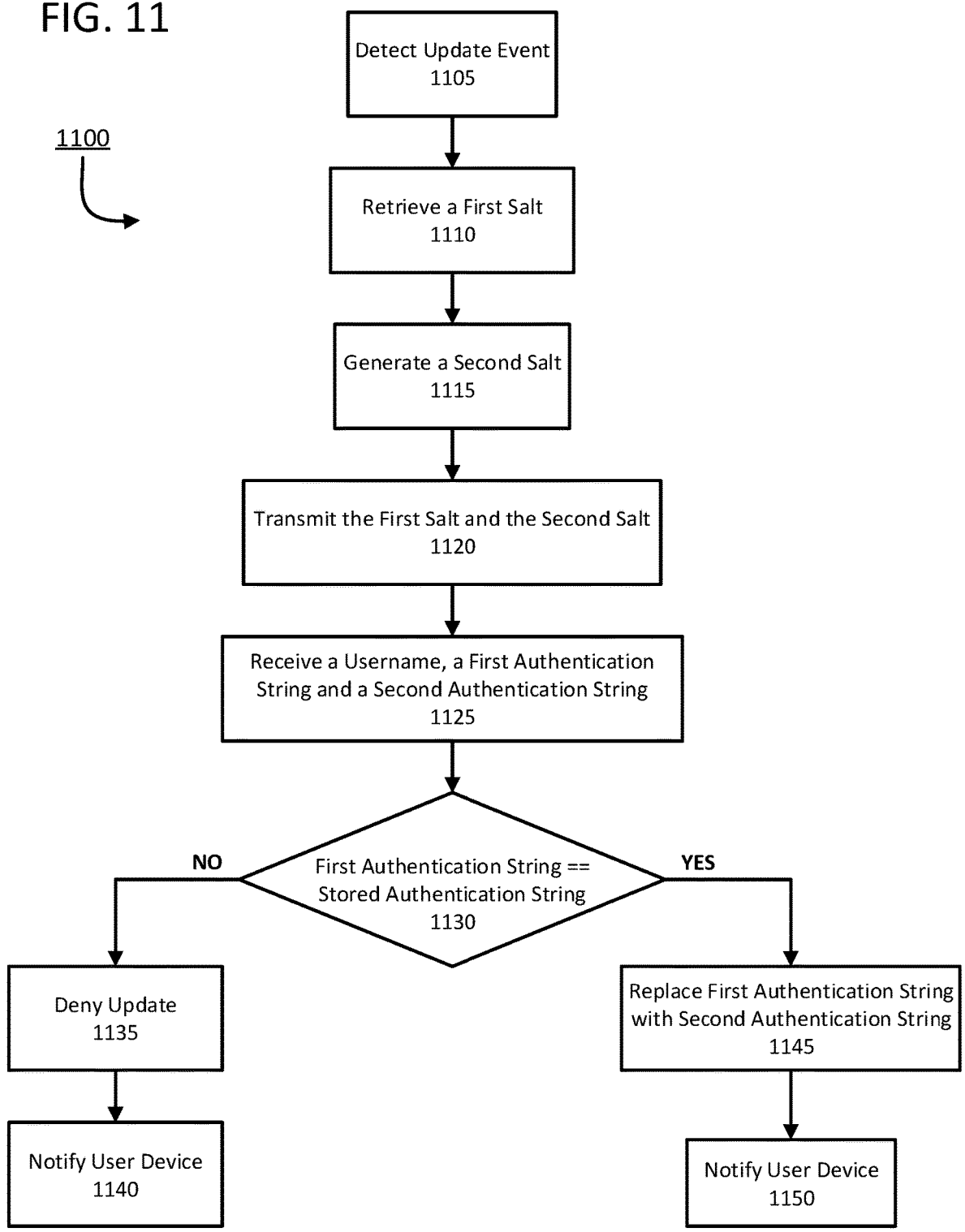
FIG. 11 shows a flow chart of a process for updating an authentication string at a server according to one or more aspects of the disclosure.

Turning to FIG. 11, a flow chart of a process of updating an authentication string at a server is shown. Some or all of the steps of process 1100 may be performed using one or more computing devices described herein.

In step 1105, the server may detect an update event. The update event may be a request from a user to update authentication information. Additionally, or alternatively, the update event may be a breach detected at the server. At step 1110, the server may retrieve the first salt. As noted above, the first salt may be retrieved from a database and/or password file via a query. In step 1115, the server may generate a second salt. The second salt may be generated using the techniques described above. For example, the second salt may be a pseudorandom character string generated by a pseudorandom number generator. In step 1120, the server may transmit the first salt and the second salt to the user device. In some examples, the server may transmit the first salt and the second salt in one or more communications via a secure communication channel. In response to transmitting the first salt and the second salt, the server may receive a username, a first authentication string, and a second authentication string from the user device in step 1125. In step 1130, the server may determine whether the first authentication string matches a stored (e.g., previously-registered) authentication string. When the authentication strings do not match, the server may deny the update in step 1135. In step 1140, the server may notify the user device was denied. In some examples, the update process may be repeated until the authentication string is updated. When the authentication strings match, the serer may replace the first authentication string with the second authentication string in step 1145. Replacing the first authentication string may comprise overwriting the first authentication string with the second authentication string in a database and/or password file. Additionally, the first salt may be replaced (e.g., overwritten) by the second salt in the database and/or password file. In step 1150, the server may notify the user device that the authentication information has been successfully updated. The notification may be a communication, such as an acknowledgement, transmitted to the user device. Additionally, or alternatively, the notification may be a push notification from the server to the user device.

Figure 12:
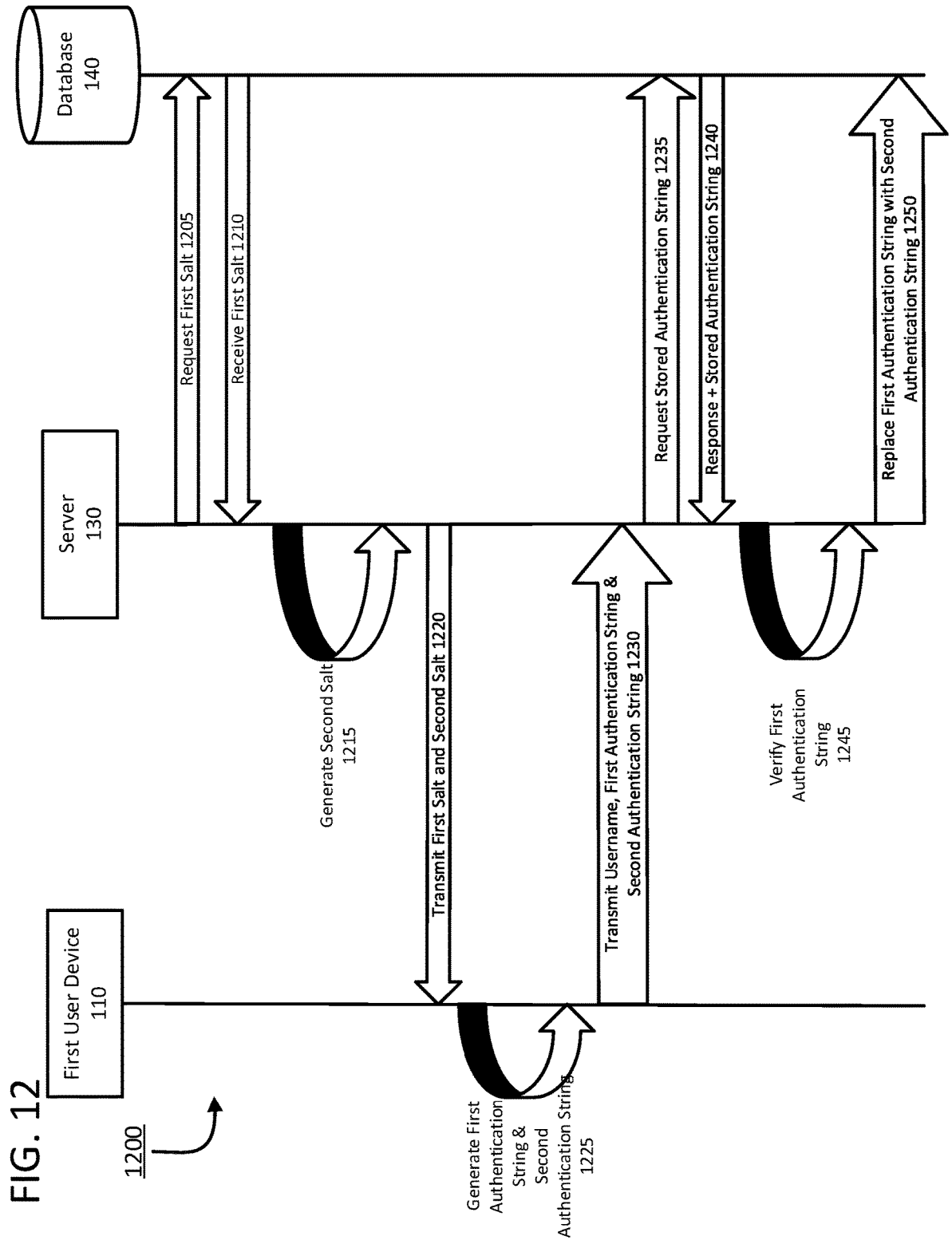
FIG. 12 shows an example of a system for updating an authentication string according to one or more aspects of the disclosure.

Turning to FIG. 12, a system 1200 for updating authentication information is shown. The system 1200 includes first user device 110, server 130, and database 140. In response to detecting an update event (e.g., a breach), server 130 may transmit a request for a first salt to database 140 in step 1205. In step 1210, the server 130 may receive the first salt from the database 140. In step 1215, the server 130 may generate a second salt, for example, based on or in response to receiving the first salt from database 140. In step 1220, the server 130 may transmit the first salt and the second salt to the user device. In step 1225, the first user device 110 may generate a first authentication string and a second authentication string. In step 1230, the first user device 110 may send (e.g., transmit) a username, the first authentication string, and the second authentication string to the server 130. In step 1235, the server 130 may request a previously-registered authentication string (e.g., stored authentication string) from the database 140. In step 1240, the database 140 may respond to the server's request with the previously registered authentication string. In step 1245, the server 130 may verify that the first authentication string matches the previously-stored authentication string. When the authentication strings match, the server 130 may transmit a request to database 140 to update the salt and authentication string associated with the username in step 1250.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

By employing the login techniques described herein, the user's password may remain secure on the user device. This reduces the likelihood of a malicious actor obtaining the user's password while the password is in-transit. Additionally, using a derivative of a password for authentication purposes secures the user's password in case of a breach at the server. This may ensure that other accounts that have the same username and password would not be compromised in the event of a breach of the server. Accordingly, the user may not have to take corrective action (e.g., update their passwords on other accounts) in response to a breach that occurs at a third-party (e.g., server), thereby improving the overall user experience.

Although the present invention has been described in certain specific aspects, many additional modifications and variations would be apparent to those skilled in the art. For example, the techniques described above apply to server-client relationships. However, it will be appreciated that the techniques described herein may have applicability to server-to-server communications. Additionally, the techniques described herein may have applicability to other static information used to authenticate a user, developer, and/or a program, such as an API key. Moreover, while the techniques have been discussed in a particular sequence, it will be appreciated that any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A method comprising:
   receiving, by a first device from a second device, a username and a first authentication string;
   comparing the first authentication string to a previously registered authentication string;
   determining, based on the first authentication string matching the previously registered authentication string, an update event;
   sending, from the first device to the second device and based on a detected security breach, an indication to update the first authentication string, wherein the indication comprises a salt value;
   receiving, from the second device, the username, the first authentication string, and a second authentication string;

verifying, based on a determination that the first authentication string matches the previously registered authentication string, the username and the first authentication string; and replacing, based on verification of the username and the first authentication string, the first authentication string with the second authentication string.

2. The method of claim 1, wherein the second authentication string is generated using the salt value.

3. The method of claim 1, further comprising:
generating the salt value using a pseudorandom number generator.

4. The method of claim 1, wherein receiving the username, the first authentication string, and the second authentication string comprises:
receiving the username, the first authentication string, and the second authentication string over a secure communication channel.

5. The method of claim 1, wherein replacing the first authentication string with the second authentication string comprises:
updating a field in a database entry associated with the username to indicate the second authentication string.

6. The method of claim 1, further comprising:
sending, to the second device and based on the replacing the first authentication string with the second authentication string, an acknowledgement that authentication information has been updated.

7. The method of claim 1, further comprising:
requesting, based on the verification of the username and the first authentication string, additional authentication information from the second device;
receiving, from the second device, the additional authentication information, wherein the additional authentication information comprises at least one of a one-time code or a biometric identifier; and
verifying the additional authentication information prior to replacing the first authentication string with the second authentication string.

8. The method of claim 1, wherein the first device generates the salt before sending the salt to the second device.

9. A method comprising:
receiving, from a first device, an indication to update a first authentication string, wherein the indication comprises a salt value;
generating a second authentication string by applying a one-way hash function to the salt value, a username, and a password, wherein one or more of the username or password is padded before applying the one-way hash function;
sending, to the first device via a secure communication channel, the username, the first authentication string, and the second authentication string; and
receiving, from the first device and based on a determination that the first authentication string matches a previously registered authentication string, an acknowledgement that authentication information has been updated.

10. The method of claim 9, further comprising:
receiving, by a second device, a request for additional authentication information;
sending, by the second device to the first device, the additional authentication information wherein the additional authentication information comprises at least one of a one-time code or a biometric identifier; and
receiving the acknowledgement that authentication information has been successfully updated after sending the additional authentication information.

11. The method of claim 9, further comprising:
padding the username prior to generating the second authentication string.

12. The method of claim 9, further comprising:
padding the password prior to generating the first authentication string.

13. The method of claim 9, further comprising:
padding the password prior to generating the second authentication string.

14. The method of claim 9, wherein the first device generates the salt before sending the salt to a second device.

15. A system comprising:
a user device; and
a server comprising:
one or more first processors; and
a first memory storing first instructions that, when executed by the one or more first processors, cause the server to:
receive, from a user device, a username and a first authentication string;
compare the first authentication string to a previously registered authentication string;
determine, based on the first authentication string matching the previously registered authentication string, an update event;
send, to the user device, an indication to update the first authentication string, wherein the indication comprises a salt value;
receive, from the user device, a second authentication string;
verify, based on a determination that the first authentication string matches the previously registered authentication string, the username and the first authentication string; and
replace, based on a verification of the username and the first authentication string, the first authentication string with the second authentication string; and
the user device comprising:
one or more hardware processors; and
a physical memory storing second instructions that, when executed by the one or more hardware processors, cause the user device to:
receive, from the server, an indication to update the first authentication string;
generate, after padding a password, a second authentication string by applying a one-way hash function to the indication, the username, and the password; and
send, to the server via a secure communication channel, the second authentication string.

16. The system of claim 15, wherein the second authentication string is generated using the salt value.

17. The system of claim 15, wherein the first instructions, when executed by the one or more first processors, cause the server to:
generate the indication using a pseudorandom number generator.

18. The system of claim 15, wherein the second instructions, when executed by the one or more hardware processors, cause the user device to:
receive, from the server and based on a determination that the first authentication string matches a previously registered authentication string, an acknowledgement that authentication information has been updated.

19. The system of claim 15, wherein the first authentication string and the second authentication string provide access to one or more user accounts hosted on the server.

20. The system of claim 15, wherein the server generates the salt before sending the salt to the user device.

* * * * *